(12) United States Patent
Woodings (10) Patent No.: US 7,653,123 B1
(45) Date of Patent: Jan. 26, 2010

(54) DYNAMIC DATA RATE USING MULTIPLICATIVE PN-CODES

(75) Inventor: Ryan Winfield Woodings, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 600 days.

(21) Appl. No.: 11/193,220

(22) Filed: Jul. 29, 2005

Related U.S. Application Data (60) Provisional application No. 60/621,348, filed on Oct. 22, 2004, provisional application No. 60/612,691, filed on Sep. 24, 2004.

(51) Int. Cl.
*H04B 1/00* (2006.01)
(52) U.S. Cl. ..................................................... 375/147
(58) Field of Classification Search ................... 375/147
See application file for complete search history.

(56) References Cited

U.S. PATENT DOCUMENTS 3,800,090 A    3/1974    Matena (Continued)

FOREIGN PATENT DOCUMENTS

JP          01279630 A      11/1989

(Continued)

OTHER PUBLICATIONS

A. Michael Noll, A. Noll, Introduction to Telephones and Telephone Systems, Artech House, Incorporated, Jun. 2004.*

(Continued)

*Primary Examiner*—Mohammad H Ghayour
*Assistant Examiner*—Nader Bolourchi (57) ABSTRACT

An improved method and apparatus is described for using a direct sequence spread spectrum (DSSS) system that takes advantage of multiplicative pseudo-noise codes (PN-Codes) in order to wirelessly connect multiple peripherals in a computer system at different data rates. The use of multiplicative PN-Codes allows the system to use multiple-length PN-Codes within the same system while minimizing the hardware needed to implement such a system. The improved method and apparatus also uses an identifier in the transmitted packet header in order to communicate the choice of PN-Code to the receiver. By using multiple-length PN-Codes in conjunction with an identifier in the packet header the improved method and apparatus allows for remote peripherals to choose a suitable data rate on a packet-by-packet basis while minimizing the system complexity.

21 Claims, 7 Drawing Sheets

U.S. PATENT DOCUMENTS

| | | | |
|---|---|---|---|
| 3,810,120 A | 5/1974 | Huettner et al. | |
| 3,864,670 A | 2/1975 | Inoue et al. | |
| 4,195,351 A | 3/1980 | Barner et al. | |
| 4,419,723 A | 12/1983 | Wilson, Jr. | |
| 4,481,625 A | 11/1984 | Roberts et al. | |
| 4,626,697 A | 12/1986 | Nelson | |
| 4,641,261 A | 2/1987 | Dwyer et al. | |
| 4,775,807 A | 10/1988 | Bukowski, Jr. | |
| 4,775,976 A | 10/1988 | Yokoyama | |
| 4,820,944 A | 4/1989 | Herlein et al. | |
| 4,862,355 A | 8/1989 | Newman et al. | |
| 4,872,107 A | 10/1989 | Marple et al. | |
| 5,048,052 A | 9/1991 | Hamatsu et al. | |
| 5,063,308 A | 11/1991 | Borkar | |
| 5,151,921 A | 9/1992 | Hashimoto | |
| 5,175,451 A | 12/1992 | Ihara | |
| 5,282,166 A | 1/1994 | Ozaki | |
| 5,289,580 A | 2/1994 | Latif et al. | |
| 5,291,515 A | 3/1994 | Uchida et al. | |
| 5,300,837 A | 4/1994 | Fischer | |
| 5,389,828 A | 2/1995 | Tago | |
| 5,404,480 A | 4/1995 | Suzuki | |
| 5,428,748 A | 6/1995 | Davidson et al. | |
| 5,434,533 A | 7/1995 | Furutani | |
| 5,437,039 A | 7/1995 | Yuen | |
| 5,467,009 A | 11/1995 | McGlichey | |
| 5,471,524 A | 11/1995 | Colvin et al. | |
| 5,475,271 A | 12/1995 | Shibasaki et al. | |
| 5,483,656 A | 1/1996 | Oprescu et al. | |
| 5,488,657 A | 1/1996 | Lynn et al. | |
| 5,495,594 A | 2/1996 | MacKenna et al. | |
| 5,497,067 A | 3/1996 | Shaw | |
| 5,509,139 A | 4/1996 | Ayash et al. | |
| 5,514,859 A | 5/1996 | Seigel | |
| 5,522,081 A | 5/1996 | Carls | |
| 5,551,044 A | 8/1996 | Shah et al. | |
| 5,553,245 A | 9/1996 | Su et al. | |
| 5,566,296 A | 10/1996 | Ohmori et al. | |
| 5,574,859 A | 11/1996 | Yeh | |
| 5,577,213 A | 11/1996 | Avery et al. | |
| 5,586,268 A | 12/1996 | Chen et al. | |
| 5,590,312 A | 12/1996 | Marisetty | |
| 5,594,370 A | 1/1997 | Nguyen et al. | |
| 5,598,409 A | 1/1997 | Madonna et al. | |
| 5,603,040 A | 2/1997 | Frager et al. | |
| 5,605,505 A | 2/1997 | Han | |
| 5,606,672 A | 2/1997 | Wade | |
| 5,606,704 A | 2/1997 | Pierce et al. | |
| 5,610,601 A | 3/1997 | Lahti et al. | |
| 5,615,344 A | 3/1997 | Corder | |
| 5,628,029 A | 5/1997 | Evoy | |
| 5,634,074 A | 5/1997 | Devon et al. | |
| 5,655,148 A | 8/1997 | Richman et al. | |
| 5,671,355 A | 9/1997 | Collins | |
| 5,673,031 A | 9/1997 | Meier | |
| 5,675,770 A | 10/1997 | Ogata | |
| 5,675,813 A | 10/1997 | Holmdahl | |
| 5,687,346 A | 11/1997 | Shinohara | |
| 5,701,429 A | 12/1997 | Legvold et al. | |
| 5,774,013 A | 6/1998 | Groe | |
| 5,787,014 A | 7/1998 | Hall et al. | |
| 5,790,331 A | 8/1998 | Aranovsky | |
| 5,794,032 A | 8/1998 | Leyda | |
| 5,794,033 A | 8/1998 | Aldebert et al. | |
| 5,796,276 A | 8/1998 | Phillips et al. | |
| 5,796,278 A | 8/1998 | Osborn et al. | |
| 5,799,196 A | 8/1998 | Flannery | |
| 5,802,558 A | 9/1998 | Pierce | |
| 5,818,780 A | 10/1998 | Manning | |
| 5,838,907 A | 11/1998 | Hansen | |
| 5,847,372 A | 12/1998 | Kreft | |
| 5,881,366 A | 3/1999 | Bodenmann et al. | |
| 5,884,086 A | 3/1999 | Amoni et al. | |
| 5,890,015 A | 3/1999 | Garney et al. | |
| 5,898,861 A | 4/1999 | Emerson et al. | |
| 5,905,389 A | 5/1999 | Alleven | |
| 5,912,569 A | 6/1999 | Alleven et al. | |
| 5,929,664 A | 7/1999 | Alleven et al. | |
| 5,931,933 A | 8/1999 | Billheimer et al. | |
| 5,938,770 A | 8/1999 | Kim | |
| 5,943,506 A * | 8/1999 | Poisner | 710/48 |
| 5,952,733 A | 9/1999 | Johnston | |
| 5,982,879 A | 11/1999 | Lucey | |
| 6,000,042 A | 12/1999 | Henrie | |
| 6,009,034 A | 12/1999 | Manning | |
| 6,012,103 A | 1/2000 | Sartore et al. | |
| 6,032,178 A | 2/2000 | Bacigalupo et al. | |
| 6,038,667 A | 3/2000 | Helbig | |
| 6,040,714 A | 3/2000 | Klein | |
| 6,040,792 A | 3/2000 | Watson et al. | |
| 6,049,870 A | 4/2000 | Greaves | |
| 6,058,026 A | 5/2000 | Rozman | |
| 6,064,554 A | 5/2000 | Kim | |
| 6,065,096 A | 5/2000 | Day et al. | |
| 6,067,589 A | 5/2000 | Mamata | |
| 6,072,681 A | 6/2000 | Cogan et al. | |
| 6,073,193 A | 6/2000 | Yap | |
| 6,094,040 A | 7/2000 | Meier et al. | |
| 6,105,097 A | 8/2000 | Larky et al. | |
| 6,124,750 A | 9/2000 | Alleven et al. | |
| 6,128,673 A | 10/2000 | Aronson et al. | |
| 6,137,188 A | 10/2000 | Mitchell et al. | |
| 6,148,346 A | 11/2000 | Hanson | |
| 6,151,645 A | 11/2000 | Young et al. | |
| 6,151,647 A * | 11/2000 | Sarat | 710/301 |
| 6,168,077 B1 | 1/2001 | Gray et al. | |
| 6,170,062 B1 | 1/2001 | Henrie | |
| 6,195,593 B1 | 2/2001 | Nguyen | |
| 6,240,522 B1 | 5/2001 | Stufflebeam | |
| 6,249,825 B1 | 6/2001 | Sartore et al. | |
| 6,266,731 B1 | 7/2001 | Riley et al. | |
| 6,334,160 B1 | 12/2001 | Emmert et al. | |
| 6,336,152 B1 | 1/2002 | Richman et al. | |
| 6,339,781 B1 | 1/2002 | Sasaki | |
| 6,345,370 B1 | 2/2002 | Kwon | |
| 6,381,666 B1 | 4/2002 | Kejser et al. | |
| 6,389,494 B1 | 5/2002 | Walton et al. | |
| 6,389,560 B1 | 5/2002 | Chew | |
| 6,393,588 B1 | 5/2002 | Hsu et al. | |
| 6,400,715 B1 | 6/2002 | Beaudoin et al. | |
| 6,408,351 B1 | 6/2002 | Hamdi et al. | |
| 6,415,342 B1 | 7/2002 | Wahl et al. | |
| 6,439,464 B1 | 8/2002 | Fruhauf et al. | |
| 6,442,734 B1 | 8/2002 | Hanson et al. | |
| 6,460,094 B1 | 10/2002 | Hanson et al. | |
| 6,493,084 B1 | 12/2002 | Friend et al. | |
| 6,502,146 B1 | 12/2002 | Rasmussen et al. | |
| 6,502,212 B1 | 12/2002 | Coyle et al. | |
| 6,510,532 B1 | 1/2003 | Pelly et al. | |
| 6,524,189 B1 | 2/2003 | Rautila | |
| 6,535,938 B1 | 3/2003 | Teramura et al. | |
| 6,541,879 B1 | 4/2003 | Wright | |
| 6,565,441 B1 | 5/2003 | Hames et al. | |
| 6,571,305 B1 | 5/2003 | Engler | |
| 6,584,519 B1 | 6/2003 | Russell | |
| 6,585,596 B1 | 7/2003 | Leifer et al. | |
| 6,603,744 B2 | 8/2003 | Mizutani et al. | |
| 6,625,761 B1 | 9/2003 | Sartore et al. | |
| 6,633,583 B1 | 10/2003 | Esterson | |
| 6,671,831 B1 | 12/2003 | Sartore et al. | |
| 6,684,062 B1 | 1/2004 | Gosior et al. | |
| 6,691,201 B1 | 2/2004 | Williams et al. | |
| 6,708,247 B1 | 3/2004 | Barret et al. | |
| 6,719,633 B1 | 4/2004 | Leifer et al. | |

| | | | |
|---|---|---|---|
| 6,725,302 B1 | 4/2004 | Benayoun et al. | |
| 6,745,253 B2 | 6/2004 | Struble | |
| 6,754,725 B1 | 6/2004 | Wright et al. | |
| 6,813,672 B1 | 11/2004 | Kamran et al. | |
| 6,820,160 B1 | 11/2004 | Allman | |
| 6,836,862 B1 | 12/2004 | Erekson et al. | |
| 6,839,778 B1 | 1/2005 | Sartore et al. | |
| 6,850,512 B1 | 2/2005 | Bishop et al. | |
| 6,862,643 B2 | 3/2005 | Wu et al. | |
| 6,898,652 B2 | 5/2005 | Peters et al. | |
| 6,903,727 B2 | 6/2005 | Mambakkam et al. | |
| 6,993,065 B2* | 1/2006 | Li et al. | 375/146 |
| 7,024,501 B1 | 4/2006 | Wright | |
| 7,028,114 B1 | 4/2006 | Milan et al. | |
| 7,028,133 B1 | 4/2006 | Jackson | |
| 7,095,792 B2* | 8/2006 | Doetsch et al. | 375/265 |
| 7,334,072 B1* | 2/2008 | Wright | 710/315 |
| 7,458,075 B2 | 11/2008 | Keys | |
| 7,536,013 B2* | 5/2009 | Dick et al. | 380/210 |
| 2002/0010821 A1 | 1/2002 | Yu et al. | |
| 2002/0170064 A1 | 11/2002 | Monroe et al. | |
| 2004/0203415 A1 | 10/2004 | Wu | |
| 2005/0027889 A1 | 2/2005 | Sandulescu | |
| 2006/0117127 A1* | 6/2006 | Milan et al. | 710/313 |

FOREIGN PATENT DOCUMENTS

| | | |
|---|---|---|
| JP | 2288724 A | 11/1990 |
| WO | WO 97/36230 A | 10/1997 |
| WO | WO 99/49415 A3 | 9/1999 |
| WO | WO 01/11476 A1 | 2/2001 |

OTHER PUBLICATIONS

C. S. Smith, "Muhiplicative Pseudo-Random Number Generators with Prime Modulus," Journal of the Association for Computing Machinery, vol. 18, No. 4, Oct. 1971 pp. 586-593.*
Falahati, S.; Svensson, A., "Hybrid type-II ARQ schemes with adaptive modulation systems for wireless channels," Vehicular Technology Conference, 1999. VTC 1999—Fall. IEEE VTS 50th, vol. 5, Sep. 19-22, 1999 pp. 2691-2695 vol. 5.*
Woodings, R.; Pandey, M., "Generating multiplicative pseudo-noise codes to support multiple data rates," Wireless Communications and Networking Conference, 2006. WCNC 2006. IEEE.*
Woodings, R.; Pandey, M., "WirelessUSB: a low power, low latency and interference immune wireless standard," Wireless Communications and Networking Conference, 2006. WCNC 2006. IEEE vol. 3, 0-0 0 pp. 1367-1373.*
"Encoder", the free encyclopedia Wikipedia online: http://en.wikipedia.org/wiki/Encoder.*
Cypress, Wireless USB LS Theory of Operation, Aug. 19, 2003, pp. 1-4.
Roberts, Spread Spectrum Scene, The ABCs of Spectrum—A Tutorial, Sep. 23, 2004, pp. 1-9.
Spread Spectrum Scene, Spread Spectrum Background, Oct. 12, 2004, pp. 1-4.
Siliconians, What is spread spectrum?, pp. 1-2.
USPTO Non-Final Rejection for U.S. Appl. No. 11/207,433 dated Oct. 1, 2008; 12 pages.
Reference Cited in U.S. Appl. No. 11/207,433: Byoung Jo Choi "Spreading Sequences;" Communications Research Group, University of Southampton, Dec. 11, 1997; 17 pages.
Reference Cited in U.S. Appl. No. 11/207,433: Falahati, S; Svensson, A., "Hybrid type-II ARQ schemes with adaptive modulation systems for wireless channels," Vehicular Technology Conference, 1999. VCT 1999-Fall. IEEE VTS 50th, vol. 5, Sep. 19-22; 5 pages.
"Universal Serial Bus Specification," Revision 2.0, Apr. 27, 2002, pp. 1-622; 650 pages.
"Universal Serial Bus Specification," Revision 1.1, Sep. 23, 1998, pp. 1-311; 327 pages.
U.S. Appl. No. 11/207,433: "Reversible PN-codes in Direct Sequence Spread Spectrum Systems," Ryan Woodings; filed on Aug. 19, 2005; 23 pages.
U.S. Appl. No. 10/839,817: "Method and Apparatus for wirelessly connecting USB Devices to a USB Host," Wright et al.; filed on May 5, 2004; 54 pages.
USPTO Non-Final Rejection for U.S. Appl. No. 10/839,817 dated Nov. 30, 2005; 8 pages.
USPTO Non-Final Rejection for U.S. Appl. No. 10/839,817 dated Jun. 20, 2006; 7 pages.
USPTO Non-Final Rejection for U.S. Appl. No. 10/839,817 dated Nov. 14, 2006; 7 pages.
USPTO Non-Final Rejection for U.S. Appl. No. 10/839,817 dated Apr. 6, 2007; 6 pages.
USPTO Notice of Allowance for U.S. Appl. No. 10/839,817 dated Sep. 25, 2007; 6 pages.
U.S. Appl. No. 10/260,054: "System, Method and Apparatus for Connecting USB Peripherals at Extended Distances from a Host Computer," Wright et al.; Sep. 27, 2002; 28 pages.
USPTO Non-Final Rejection for U.S. Appl. No. 10/260,054 dated Nov. 12, 2004; 7 pages.
USPTO Non-Final Rejection for U.S. Appl. No. 10/260,054 dated Jul. 22, 2005; 6 pages.
USPTO Final Rejection for U.S. Appl. No. 10/260,054 dated Jan. 9, 2006; 7 pages.
USPTO Non-Final Rejection for U.S. Appl. No. 10/260,054 dated Jun. 28, 2006; 6 pages.
USPTO Final Rejection for U.S. Appl. No. 10/260,054 dated Dec. 12, 2006; 6 pages.
USPTO Non-Final Rejection for U.S. Appl. No. 10/260,054 dated Jul. 17, 2007; 6 pages.
USPTO Notice of Allowance for U.S. Appl. No. 10/260,054 dated Feb. 22, 2008; 6 pages.
U.S. Appl. No. 10/299,429: "Method and Apparatus for Attaching USB Peripherals to Host Ports," Wright at al.; filed on Nov. 18, 2002; 17 pages.
USPTO Non-Final Rejection for U.S. Appl. No. 10/299,429 dated Mar. 12, 2004; 7 pages.
USPTO Final Rejection for U.S. Appl. No. 10/299,429 dated Aug. 31, 2004; 11 pages.
USPTO Final Rejection for U.S. Appl. No. 10/299,429 dated Nov. 10, 2004; 14 pages.
USPTO Notice of Allowance for U.S. Appl. No. 10/299,429 dated Apr. 18, 2005; 6 pages.
U.S. Appl. No. 09/816,963: "USB Hub Power Management," David G. Wright; filed on Mar. 23, 2001; 15 pages.
U.S. Appl. No. 09/850,468: "Improvement USB Peripheral Containing Its Own Device Driver," Wright et al.; filed on May 7, 2001: 27 pages.
U.S. Appl. No. 09/598,561: "Dual Mode USB-PS/2 Device," Williams et al.; filed on Jun. 21, 2000; 21 pages.
U.S. Appl. No. 09/590,831: "Speed Power Efficient USB Method," Sartore et al.; filed on Jun. 9, 2000; 18 pages.
USPTO Non-final Rejection for U.S. Appl. No. 09/590,831 dated Feb. 12, 2003; 9 pages.
USPTO Final Rejection for U.S. Appl. No. 09/590,831 dated Apr. 24, 2003; 11 pages.
USPTO Advisory Action for U.S. Appl. No. 09/590,831 dated Aug. 19, 2003; 3 pages.
USPTO Non-Final Rejection for U.S. Appl. No. 09/590,831 dated Jan. 8, 2004; 6 pages.
USPTO Notice of Allowance for U.S. Appl. No. 09/590,831 dated Aug. 18, 2004; 4 pages.
U.S. Appl. No. 09/935,017: "Apparatus for Optically Isolating a USB Peripheral from USB Host," Stuart Allman; Aug. 21, 2001; 30 pages.
USPTO Non-Final Rejection for U.S. Appl. No. 09/935,017 dated Feb. 6, 2004; 6 pages.
USPTO Notice of Allowance for U.S. Appl. No. 09/935,017 dated Jun. 21, 2004; 6 pages.
U.S. Appl. No. 09/791,355: "EMC Performance Enhancement for USB Devices," Kamran at al.; filed on Feb. 23, 2001; 29 pages.
USPTO Non-Final Rejection for U.S. Appl. No. 09/791,355 dated Nov. 6, 2003; 10 pages.
USPTO Non-Final Rejection for U.S. Appl. No. 09/791,355 dated Feb. 12, 2004; 9 pages.

USPTO Notice of Allowance for U.S. Appl. No. 09/791,355 dated May 26, 2004; 4 pages.
USPTO Non-Final Rejection for U.S. Appl. No. 09/816,963 dated Dec. 19, 2001; 7 pages.
USPTO Final Rejection for U.S. Appl. No. 09/816,963 dated May 29, 2002; 4 pages.
USPTO Advisory Action for U.S. Appl. No. 09/816,963 dated Aug. 19, 2002; 2 pages.
USPTO Notice of Allowance for U.S. Appl. No. 09/816,963 dated Nov. 14, 2002; 5 pages.
USPTO Non-Final Rejection for U.S. Appl. No. 09/850,468 dated Sep. 4, 2003; 10 pages.
USPTO Notice of Allowance for U.S. Appl. No. 09/850,468 dated Feb. 20, 2004; 3 pages.
USPTO Non-Final Rejection for U.S. Appl. No. 09/598,561 dated May 27, 2003; 9 pages.
USPTO Notice of Allowance for U.S. Appl. No. 09/598,561 dated Oct. 1, 2003; 6 pages.
U.S. Appl. No. 09/592,201: "Fault Tolerant USB Method and Apparatus," Sartore et al.; Jun. 13, 2000; 22 pages.
USPTO Non-Final Rejection for U.S. Appl. No. 09/592,201 dated Feb. 3, 2003; 8 pages.
USPTO Final Rejection for U.S. Appl. No. 09/592,201 dated Jun. 20, 2003; 5 pages.
USPTO Notice of Allowance for U.S. Appl. No. 09/592,201 dated Aug. 11, 2003; 4 pages.
U.S. Appl. No. 09/592,206: "Fault Tolerant USB Method and Apparatus," Sartore et al.; Jun. 13, 2000; 22 pages.
USPTO Non-Final Rejection for U.S. Appl. No. 09/592,206 dated Jan. 29, 2003; 7 pages.
USPTO Notice of Allowance for U.S. Appl. No. 09/592,206 dated May 6, 2003; 7 pages.
U.S. Appl. No. 08/839,981: "Fail Safe Method and Apparatus for a USB Device," Kok-Kean Yap; filed on Apr. 24, 1997; 32 pages.
USPTO Non-Final Rejection for U.S. Appl. No. 08/839,981 dated May 28, 1998; 10 pages.
USPTO Non-Final Rejection for U.S. Appl. No. 08/839,981 dated Nov. 4, 1998; 7 pages.
USPTO Non-Final Rejection for U.S. Appl. No. 08/839,981 dated Jun. 9, 1999; 7 pages.
USPTO Notice of Allowance for U.S. Appl. No. 08/839,981 dated Nov. 9, 1999; 3 pages.
U.S. Appl. No. 08/995,494: "Circuit Sensing Gated Current Source for Delay Reduction in a Universal Serial Bus (USB) Low Speed Output Driver," Alleven et al.; filed on Dec. 22, 1997; 22 pages.
USPTO Non-Final Rejection for U.S. Appl. No. 08/995,494 dated May 14, 1999; 9 pages.
USPTO Final Rejection for U.S. Appl. No. 08/995,494 dated Jul. 12, 1999; 8 pages.
USPTO Notice of Allowance for U.S. Appl. No. 08/995,494 dated Oct. 14, 1999; 3 pages.
U.S. Appl. No. 08/935,350: "Methods, Circuits and Devices for Reducing and/or Improving Crossover Performance and/or Monotonicity, and Applications of the Same in a Universal Serial Bus (USB) Low Speed Output Driver," Alleven et al.; filed on Sep. 22, 1997; 42 pages.
USPTO Non-Final Rejection for U.S. Appl. No. 08/935,350 dated Sep. 21, 1998; 14 pages.
USPTO Notice of Allowance for U.S. Appl. No. 08/935,350 dated Jan. 11, 1999; 6 pages.
U.S. Appl. No. 08/934,933: "Methods, Circuits and Devices for Improving Crossover Performance and/or Monotonicity, and Applications of the Same in a Universal Serial Bus (USB) Low Speed Output Driver," Alleven at al.; filed on Sep. 22, 1997: 42 pages.
USPTO Non-Final Rejection for U.S. Appl. No. 08/934,933 dated Sep. 16, 1998; 11 pages.
USPTO Notice of Allowance for U.S. Appl. No. 08/934,933 dated Dec. 21, 1998; 5 pages.
U.S. Appl. No. 08/934,805: "Methods, Circuits and Devices for Improving Crossover Performance and/or Monotonicity, and Applications of the Same in a Universal Serial Bus (USB) Low Speed Output Driver," Alleven et al.; filed on Sep. 22, 1997; 42 pages.
USPTO Non-Final Rejection for U.S. Appl. No. 08/934,805 dated Sep. 23, 1998; 11 pages.
USPTO Notice of Allowance for U.S. Appl. No. 08/934,805 dated Dec. 21, 1998; 3 pages.
International Search Report of the International Searching Authority for International U.S. Appl. No. PCT/US97/04032 mailed Jul. 11, 1997; 3 pages.
"Universal Serial Bus Specification," Chapter 7—Electrical, Revision 1.0, Jan. 15, 1996, pp, 111-143; 33 pages.
"IBM Personal System/2 Mouse Technical Reference," Second Edition, Jun. 1989, pp. 1-36; 22 pages.
"Silicom Releases World's First Self-Install USB Product," Silicom Ltd. Connectivity Solutions, <http://www.silicom.co.ll/news/130801u2es.htm>; Aug. 13, 2001; 2 pages.
"Silicom Announces Pioneering USB Self-Install Technology," Silicom Ltd. Connectivity Solutions, <http://www.silicom.co.ll/news/201100usb.htm>; Nov. 20, 2000; 3 pages.
"Design Guide for a Low Speed Buffer for the Universal Serial Bus," Revision 1.1, Dec. 1996, Intel Corporation; pp. 1-29; 33 pages.

* cited by examiner

DYNAMIC DATA RATE USING MULTIPLICATIVE PN-CODES

RELATED APPLICATIONS

This application is a non-provisional application of provisional applications:
1) Application Ser. No. 60/621,348 filed Oct. 22, 2004.
2) Application Ser. No. 60/612,691 filed Sep. 24, 2004.

Priority of applications 60/621,348 and 60/612,691 is hereby claimed. The contents of applications 60/621,348 and 60/612,691 are hereby incorporated by reference.

FIELD OF THE INVENTION

The present invention relates generally to electronic circuits, and more in particularly to circuits for wireless communications

BACKGROUND OF THE INVENTION

Many conventional computer systems include interfaces to multiple peripheral devices. Some peripherals, such as a keyboard, a mouse and a monitor are generally necessary. Other peripherals are optional. The optional peripherals in any particular system depend on the needs of the particular user. Optional peripherals may include speakers, digitizing pads, printers, scanners, modems, external hard drives, memory cards, camera interfaces, and the like. Many different types of interfaces (e.g. RS-232 serial port, parallel printer port, game port, etc.) have been developed in order to connect peripheral devices to computer systems. In many systems each peripheral device requires its own dedicated interface. Such a technique for connecting peripherals is adequate when the number of peripheral devices does not exceed the number of interfaces available; however, once all the interfaces in such a system are in use it is not possible to add any more peripherals to the system. This limitation, among other, led to the development of the Universal Serial Bus (USB) interface.

USB is a serial digital interface that can provide up to 127 cascading interface ports controllable through a single USB interface on a computer. The USB interface eliminates the need for a new interface each time a peripheral is added to a system. However, the USB interface still generally requires a cable to connect a peripheral to a computer. While a USB cable is relatively small, the connection of multiple peripherals to a computer can quickly create a cabling mess.

One method of eliminating cables and going wireless uses a narrowband wireless transceiver connected to a computer. The peripheral then communicates with the wireless transceiver using a dedicated radio frequency (RF) channel to transmit information, usually at 49 MHz. However, a narrowband wireless system is prone to interference from other wireless devices and it is easy for an unauthorized user to tap into such a connection. Since narrowband transmission is less than ideal for adding wireless peripherals to a computer, other RF techniques have been developed. One of these other techniques is called direct sequence spread spectrum (DSSS).

The advantage of using a DSSS connection is that DSSS uses a more robust signal that is less susceptible to interference or eavesdropping versus a narrowband system. DSSS works by first encoding a data stream to be transmitted by using a multi-bit (referred to as multi-chip) pseudo-noise code (PN-Code) to replace each logical 1 and 0 of the data stream with either the PN-Code itself or the logical inverse of the PN-Code. The encoded data stream is then modulated onto an RF carrier and broadcast to the DSSS receiver.

DSSS systems can use a fixed-length PN-Code or they can use a varying-length PN-Code. However, DSSS systems are usually designed to use a fixed-length PN-Code in order to simplify the hardware needed to transmit and receive the data. For example, a well-known standard designated as IEEE 802.11 wireless LAN (WLAN) only uses a fixed-length 11-chip PN-Code called a Barker code. DSSS systems that are designed with varying-length PN-Codes are generally more costly to build and as such they are often not suitable for cost-sensitive applications.

Even though a fixed-length PN-Code keeps the complexity of a DSSS system to a minimum it does come at the cost of system flexibility. This is because the length of the PN-Code directly affects the transmission range and the data rate of the DSSS system—with longer PN-Codes allowing for greater transmission range and shorter PN-Codes allowing for greater data throughput. Therefore a fixed length PN-Code DSSS system is generally unable to adaptively alter the transmission range or the data throughput of the system.

SUMMARY OF THE INVENTION

The present invention provides for a wireless DSSS system for connecting peripheral devices to a computer system. The system provided by the present invention operates at different data rates by utilizing variables length PN-Codes that are pre-loaded into the receiver. The variable length PN-codes are formed from multiplicative PN-Codes that are combined. Packet headers are used to indicate which PN-Code a receiver should use to decode each particular packet. The system can change data rates and PN-codes on a packet-by-packet basis.

DETAILED DESCRIPTION

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate preferred embodiments of the invention and the operation of such embodiments. In the figures, the size of the boxes is not intended to represent the size of the various physical components. Were the same element appears in multiple figures, the same reference numeral is used to denote the element in all of the figures where it appears.

Only those parts of the various units are shown and described which are necessary to convey an understanding of the embodiment to those skilled in the art. Those parts and elements not shown are conventional and known in the art.

Figure 1:
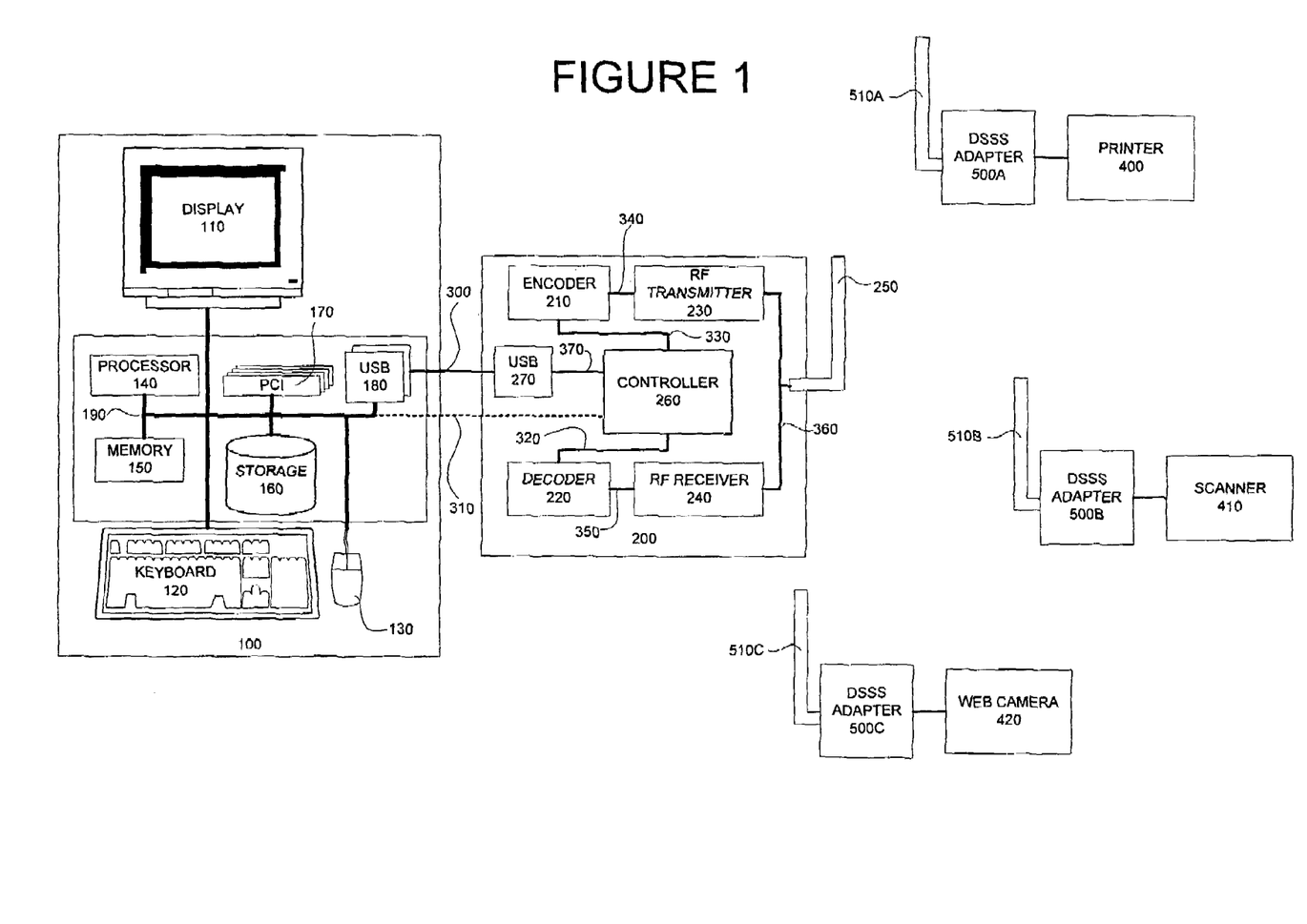
FIG. 1 is a diagram providing an overview of a first embodiment.

A first embodiment of the invention is shown in FIG. 1. In this first embodiment a computer 100 is connected to a number of peripheral devices using a wireless direct sequence spread spectrum (DSSS) connection. The first embodiment described herein utilizes the USB protocol. However, as explained below other embodiments utilize various other protocols.

The computer 100 is conventional computer and it includes a display 110, keyboard 120, mouse 130, processor 140, memory 150, non-volatile storage such as a hard drive 160, expansion connectors such as PCI 170. Computer 100 also includes one or more Universal Serial Bus (USB) ports 180, all of which are interconnected to each other through an internal bus structure 190. In this embodiment the peripheral devices include a printer 400, a scanner 410 and a web camera 420.

The computer 100 is also connected to a DSSS adapter 200 and each one of the peripheral devices has a DSSS adapter 500 (individually designated 500A, 500B and 500C). All the elements of the computer 100 and the peripherals devices are conventional and commercially available except for the DSSS adapters 200 and 500. DSSS adapters 500A, 500B and 500C are identical to each other and they are identical to, and perform the same functions as, DSSS adapter 200. Each DSSS adapter 500 has an antenna 510 (individually designated 510A, 510B and 510C) that performs the same function as antenna 250. Since the operations of DSSS adapters 500 are similar to the operation of DSSS adapter 200, the following discussion will only focus on the operation of DSSS adapter 200.

DSSS adapter 200 includes USB Port 270, controller 260, encoder 210, decoder 220, radio frequency (RF) transmitter 230, RF receiver 240, and antenna 250. Each one of these elements will be explored in greater detail as follows.

USB port 270 enables communications between the DSSS adapter 200 and computer 100. USB port 270 communicates directly with USB port 180 on computer 100 through connection 300. This allows data from the computer 100 to be sent to DSSS adapter 200 and vice versa.

Controller 260 is used to initialize and control the DSSS adapter 200. As will be discussed in more detail later, this initialization includes the selection of a code word to encode the data called a pseudo-noise code (PN-Code). Controller 260 also controls the flow of data between computer 100 and the DSSS adapter 200. Controller 260 receives data from and sends data to computer 100 by using connection 370 and USB port 270.

Encoder 210 takes the data received from controller 260 on connection 330 and encodes it. Once the data is encoded it is sent over connection 340 to RF transmitter 230. RF transmitter 230 then takes the encoded data and modulates it with an RF carrier. The modulated signal is then sent over connection 360 to antenna 250 where it is broadcast to the wireless peripherals.

Decoder 220 decodes the wireless data received by the DSSS adapter 200. The wireless data is received by antenna 250 and is sent to RF receiver 240 using connection 360. The RF receiver de-modulates the received data from the RF carrier and sends it to decoder 220 using connection 350. Decoder 220 then does two operations on the data. First, it attempts to lock-on to the beginning of the data stream. Once the decoder 220 has locked on to the beginning of the data stream it then needs to decode the data. Decoding the data is necessary since the data received by the DSSS adapter is in an encoded format. Both the lock-on and decoding functions will be described in more detail later. Once the data is decoded it is sent on to controller 260 using connection 320. Controller 260 then sends the data on to computer 100 by using connection 370 and USB port 270.

The foregoing description of the DSSS system is but one possible implementation however other implementations are possible. For example, the dotted line 390 in FIG. 1 illustrates an alternative means of connecting the DSSS adapter 200 to the computer 100 by directly connecting the DSSS adapter 200 to the internal bus 190 of the computer through connection 310. This means is particularly attractive if the DSSS adapter 200 is to be incorporated into the computer 100 directly and it would eliminate the need for the DSSS adapter 200 to have a USB port 270.

Another alternative implementation of the DSSS adapter 200 involves using the processor 140 on the computer 100 to take over the initialization functions of controller 260, thus reducing the processing requirements of controller 260 or even possibly eliminating it altogether. Doing this would lower the overall cost of the DSSS adapter 200.

The above-mentioned alternative implementations are but a few of the many possible alternative implementations that could be incorporated into the DSSS adapter 200. However, none of the potential alternative implementations will be explored further in order to simplify the discussion, as they would be obvious to one skilled in the art.

The basic operation of the DSSS system using the improved method and apparatus will now be discussed in more detail. The following discussion will focus on three topics: Choice of PN-Codes, Transmitting Data, and Receiving Data.

Choice of PN-Codes: Key to the operation of a DSSS system is the use of pseudo-noise codes (PN-Codes). A PN-Code is a carefully chosen 'multi-chip' word that is used to replace the 1s and 0s of the data stream to be transmitted. The term multi-chip is used instead of multi-bit in order to avoid confusion between the bits in the data stream to be transmitted and the bits that are used in the PN-Code. The PN-Code is chosen to have certain properties that make it ideal for use in a DSSS system. These properties include PN-Code length, auto-correlation and whiteness.

PN-Codes can be of any length; however PN-Codes of 11 to 64 chips in length are typical. The length of the PN-Code directly affects the performance of the DSSS system, with longer PN-Codes affording better transmission range and shorter PN-Codes affording better data rates. Longer PN-Codes offer better transmission range than shorter PN-Codes because of the extra 'chips' used in the longer PN-Codes. These extra chips allow for some level of redundancy in the transmitted signal thus the receiver is more likely to recover the encoded data even if interference in the transmission causes errors in the transmitted signal.

On the other hand, shorter PN-Codes allow for greater data rates than longer PN-Codes because shorter PN-Codes take less time to transmit than longer PN-Codes. This shorter transmission time means that more data bits can be encoded and sent in the same period of time versus using a longer PN-Code.

Auto correlation refers to the ability of the correlator circuit to properly identify a valid PN-Code that defines the start of a sequence. A poorly chosen PN code can cause problems in correlation. For example, a PN-Code that is 4-chips long and consists of 1010 could conceivably create a sequence that looks like 1010 1010 1010. A PN-Code such as this would make it very difficult to determine the start of a multi-chip word since the 1010 pattern is repeated on both the multi-chip word boundary and in the middle of the multi-chip word as well. The PN-Code needs to be chosen so as to avoid these 'inadvertent' pattern matches that could confuse the correlator.

Whiteness in a PN-Code refers to the spread of 1's and 0's in the multi-chip word. Failure to provide proper whiteness in the PN-Code could impair the performance of the DSSS system by reducing the overall spectral content of the transmitted signal thus making the DSSS signal look and perform more like a narrowband signal. As was previously discussed in the Background of the Invention, a narrowband signal is more susceptible to interference and eavesdropping than a DSSS signal. However, a properly chosen PN-Code would keep this from happening. For example, using a 10-bit PN-Code of 1101011001 generates more spectral content in the transmitted RF signal versus using a PN-Code of 1111100000. This is because the former PN-Code contains many more transitions in the same time period versus the latter PN-Code thus the frequency content is greater which in turn leads to greater spectral content. Proper choice of PN-Code for whiteness is important to maximizing the spectral content of the transmitted signal.

Even though the choice of PN-Code generally takes all three factors into account: namely, PN-Code length, auto correlation, and whiteness—only PN-Code length directly affects the data rate. The present improved method and apparatus takes advantage of this by changing the length of the PN-Code to vary the data rate of the DSSS system on a packet-by-packet basis by using multiplicative PN-Codes.

Figure 2:
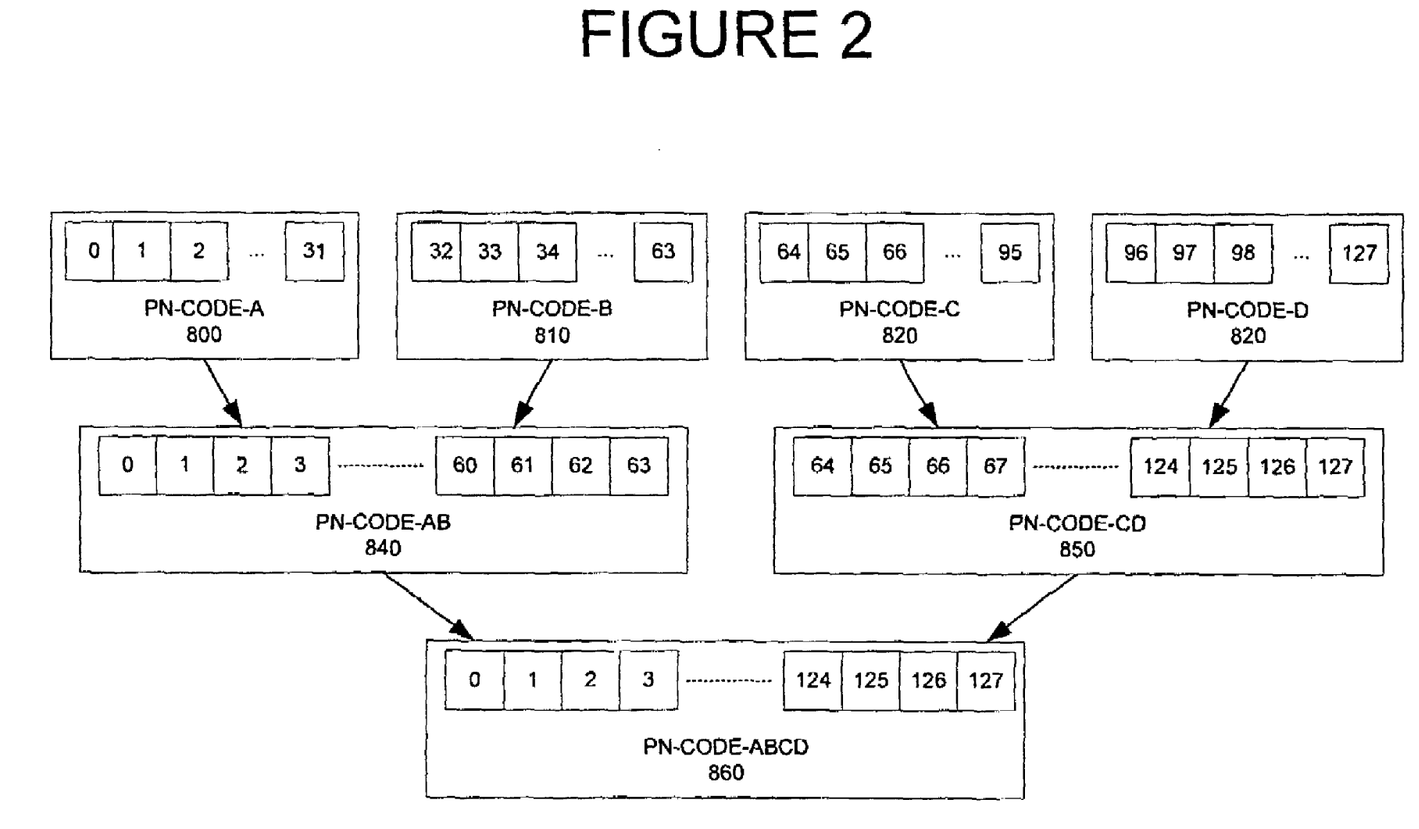
FIG. 2 illustrates a typical multiplicative pseudo-noise code (PN-Code).

Multiplicative PN-Codes are special PN-Codes that can be concatenated to create larger PN-Codes. FIG. 2 shows an example of multiplicative PN-Codes. In this example, PN-CODE-A 800, PN-CODE-B 810, PN-CODE-C 820, and PN-CODE-D 830 are each 32-chips wide. PN-CODE-A 800 and PN-CODE-B 810 are combined to create a 64-chip wide PN-CODE-AB 840. Likewise, PN-CODE-C 820 and PN-CODE-D 830 are combined to create a 64-chip wide PN-CODE-CD 850. This can be taken one step further by combining PN-CODE-AB 840 and PN-CODE-CD 850 to create a 128-chip wide PN-CODE-ABCD 860. By using the improved method and apparatus to take advantage of the multiplicative codes as described above it is possible to use a single 128-chip PN-Code to represent seven different PN-Codes of varying lengths.

The foregoing example using four 32-chip words is but one possible option for a multiplicative PN-Code and other lengths or quantities of PN-Codes can also be used. However, the following discussion will use the PN-Codes from FIG. 2 in order to simplify the discussion.

Figure 3:
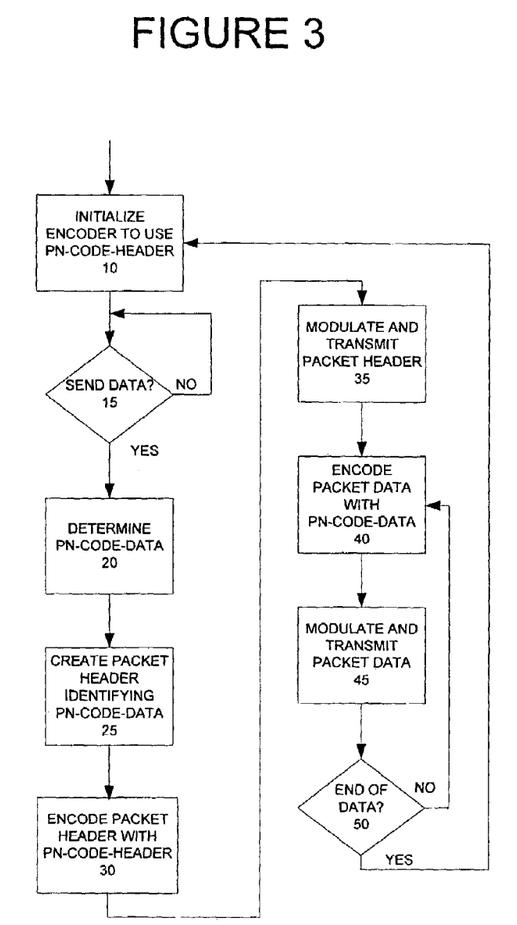
FIG. 3 is a flowchart showing a method of transmitting a wireless packet.

Transmitting Data: FIG. 3 shows a flowchart for transmitting data using the improved DSSS system. The flowchart will be discussed with reference to the DSSS system of FIG. 1 and the multiplicative PN-Codes of FIG. 2.

The first step 10 is to have the controller 260 or computer 100 to initialize the encoder 210 to use a first code word called PN-CODE-HEADER. PN-CODE-HEADER is one of the seven PN-Codes that comprise PN-CODE-ABCD 860. This means that PN-CODE-HEADER could be PN-CODE-A 800, PN-CODE-B 810, PN-CODE-C 820, PN-CODE-D 830, PN-CODE-AB 840, PN-CODE-CD 850, or even PN-CODE-ABCD 860. The choice of PN-CODE-HEADER should be the same for all the devices that are connected to the same DSSS system. By using the same PN-CODE-HEADER for all the devices in the system it is possible to initiate communications between a transmitter and receiver without having to first determine which PN-Code was used to encode the data.

Once the PN-CODE-HEADER has been chosen, the second step 15 is to wait for data to be received for transmission. The data to be transmitted generally comes from the computer 100. This data can be either packetized data or streaming data depending on the application, however packetized data is more common. The data can originate from memory 150, storage 160, the processor 140, from any other source connected to the computer 100, or any combination of these sources. The computer 100 sends the data to be transmitted to the DSSS adapter 200 by using USB port 180, connection 300 and USB port 270. Data received at USB port 270 is then sent to controller 260 using connection 370 and finally to encoder 210 using connection 330.

The third step 20 occurs once there is data to be transmitted. In this step the controller 260 needs to determine a second code word called PN-CODE-DATA that will be used to encode the data to be sent. Like PN-CODE-HEADER, PN-CODE-DATA is one of the seven PN-Codes that comprise PN-CODE-ABCD 860. However, while PN-CODE-HEADER is chosen to allow all the devices to communicate using a common PN-Code, PN-CODE-DATA can be chosen based on the desired data rate of the peripheral, with the length of PN-CODE-DATA controlling the data rate.

The fourth step 25 is to create a header packet that includes an identifier to identify PN-CODE-DATA. This identifier can be the PN-CODE-DATA itself or it can be a mnemonic that identifies the PN-CODE-DATA that was chosen. The header packet can be created by the controller 260 and sent to the encoder 210 using connection 330.

Figure 4A:
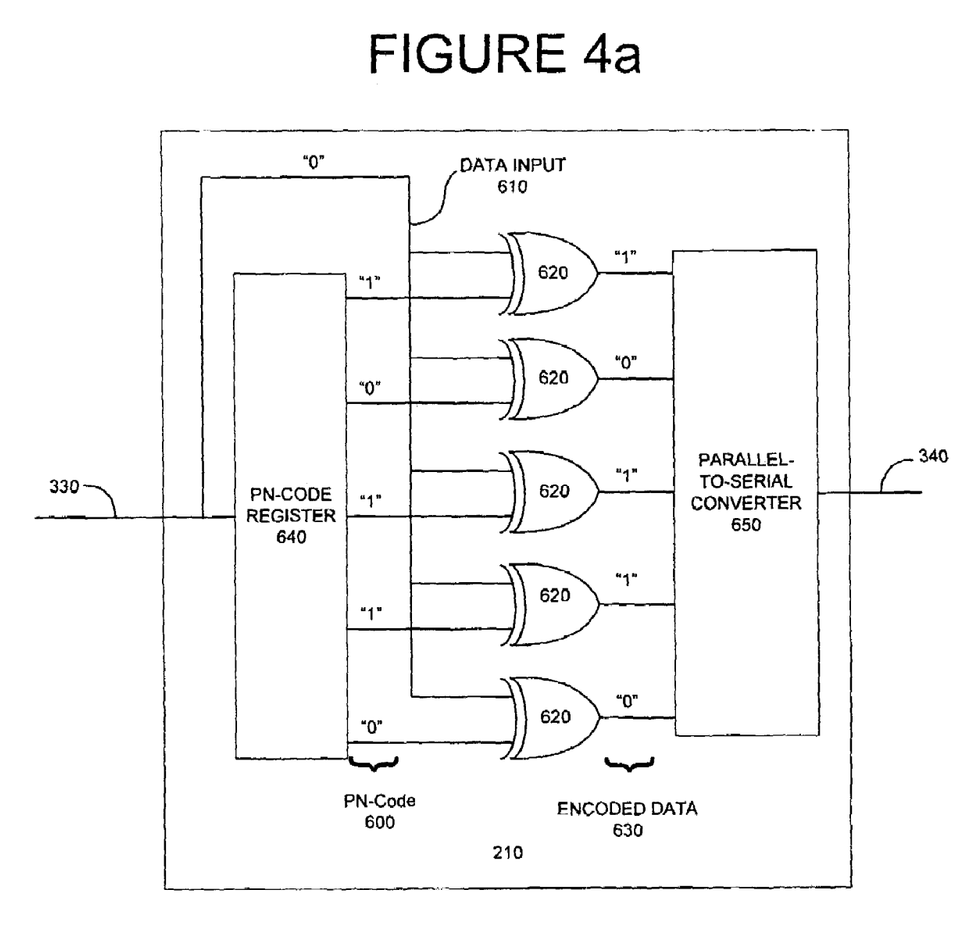
FIG. 4a is a schematic of an encoder encoding a logical 0.
Figure 4B:
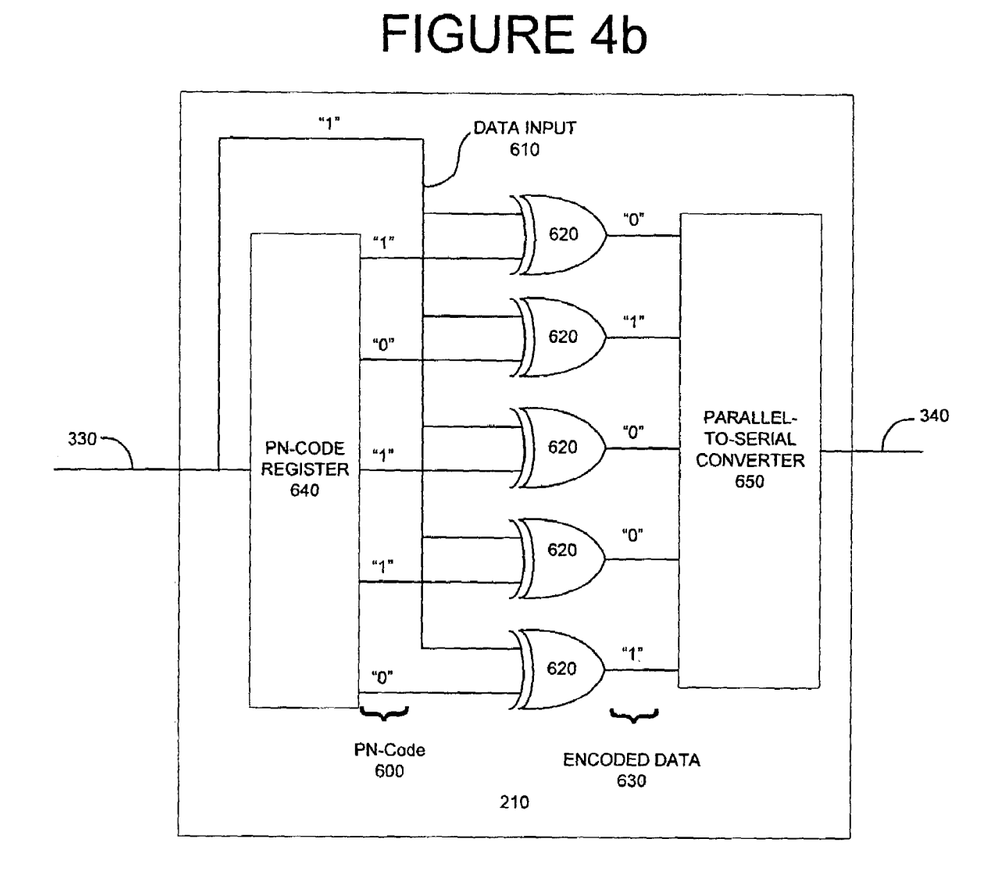
FIG. 4b is a schematic of an encoder encoding a logical 1.

The fifth step 30 is to encode the header packet using PN-CODE-HEADER and encoder 210. The job of the encoder circuitry is to replace all the logical 1's and 0's of the data to be transmitted with the selected PN-Code or the inverse of the selected PN-Code. This is typically done by logically XORing the data stream with the PN-Code to produce the resultant multi-chip word. The net effect of XORing the data with the PN-Code is that a logical 0 is replaced with a duplicate of the PN-Code, while a logical 1 is replaced with the inverse of the PN-Code (the 1's and 0's of the PN-Code are inverted). FIGS. 4a, 4b show the encoder 210 in greater detail.

FIG. 4a shows a simplified diagram of the encoder 210 and one example of how a logical 0 can be encoded using a PN-Code. The PN-Code register 640 is pre-loaded with the PN-Code 600; in this example it is a five-chip code "10110." The size of the PN-Code register 640 is the same size as the largest PN-Code expected. Each output line of the PN-Code register 640 is connected to one input of a two-input XOR gate 620. The other inputs of the XOR gates 620 are all connected to an incoming data input line 610 carrying the data to be transmitted, in this example it is a logical 0. The XOR gates 620 output data to a parallel-to-serial converter 650. In this example, the result of the XOR gates 620 is encoded data 630 "10110" that duplicates the PN-Code 600. The output of the parallel-to-serial converter 650 is then sent on connection 340 to the RF transmitter 230.

FIG. 4b shows the result of encoding a logical 1. The same circuit is used as in FIG. 4a except that data input 610 is a logical 1 instead of a logical 0. The net result of XORing a logical 1 instead of a logical 0 is that the output of XOR gates 620 is the inverse of the PN-Code, in this example encoded data 630 "01001."

Returning to FIG. 3, after encoding the packet header the sixth step 35 is to modulate the encoded packet header onto an RF carrier and transmit it using antenna 250. Any appropriate modulation scheme can be used to modulate the data depending on the needs of the system.

The seventh step 40 and eighth step 45 to transmit the data portion of the packet are similar to steps 30 and 35 respectively, however the PN-Code used to encode the data is the PN-CODE-DATA. By using different PN-codes to encode the header packet (PN-CODE-HEADER) and the data packet (PN-CODE-DATA) the system is able to initiate communications using a first code word, but it is then able to send the data at a different data rate by using a second code word of a different length from the first code word.

The ninth step 50 determines if the whole data packet has been transmitted. If there is more data to send then steps 40 and 45 are repeated until all the data has been sent. Once all the data has been sent the system returns to step 10 and awaits additional data to be sent.

Figure 5:
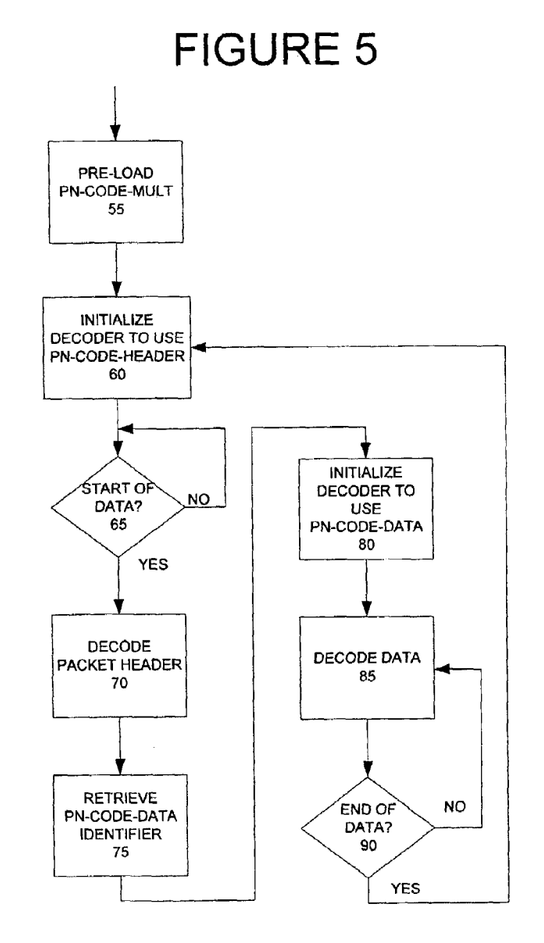
FIG. 5 is a flowchart showing a method of receiving a wireless packet

Receiving Data: FIG. 5 shows a flowchart for decoding data that has been received by the antenna 250 and demodulated in the RF receiver 240 using the improved DSSS system. The flowchart will be discussed with reference to the DSSS system of FIG. 1 and the multiplicative PN-Codes of FIG. 2.

The first step 55 is to pre-load PN-CODE-ABCD into the decoder 220. By pre-loading PN-CODE-ABCD into the decoder circuitry it is possible for the DSSS system to receive encoded data that was encoded using PN-CODE-ABCD or any of the multiplicative PN-Codes used in PN-CODE-ABCD without having to swap PN-Codes in and out of the decoder 220.

The second step 60 is to initialize decoder 220 to use PN-CODE-HEADER to detect the incoming data stream. PN-CODE-HEADER is the PN-Code that was used to encode the header packet of the transmitted data.

The third step 65 is to determine the start of the encoded data stream using PN-CODE-HEADER. By finding the start of the encoded data stream the decoder can 'lock' on to it and determine the start of each multi-chip word received. A correlator circuit located in the decoder 220 is used to find the start of the encoded data stream. The correlator circuit works by constantly scanning the incoming data stream for a multi-chip word that matches the desired PN-Code, in this case PN-CODE-HEADER.

Figure 6:
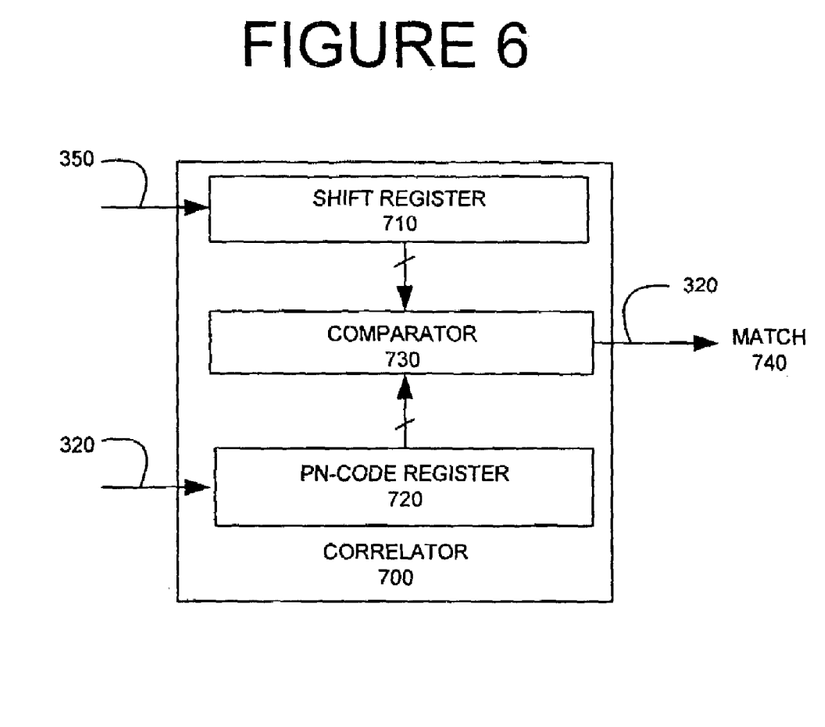
FIG. 6 shows a typical correlator circuit

FIG. 6 shows one possible implementation of a correlator circuit. The correlator 700 contains a shift register 710, PN-Code register 720, and a comparator 730. The shift register and the PN-Code register 720 are the same length as PN-CODE-ABCD. The shift register 710 takes the serial incoming data from the RF receiver 240 on connection 350 and continuously shifts it through the shift register 710. The PN-Code register 720 is pre-loaded in step 55 of FIG. 5 with PN-CODE-ABCD by the controller 260 using connection 320. The comparator 730 does a continuous bit-by-bit 'equals' comparison of the data in the shift register 710 and the PN-Code register 720 and looks for a match between the two. If there is a match then it is indicated on output match 740 that is connected to controller 260 on connection 320.

Match 740 is designed to indicate a match between the data and PN-CODE-ABCD or any of the multiplicative codes that make up PN-CODE-ABCD. For example, match 740 can indicate a data match with any of the seven possible PN-Codes (PN-CODE-A 800, PN-CODE-B 810, PN-CODE-C 820, PN-CODE-D 830, PN-CODE-AB 840, PN-CODE-CD 850, and PN-CODE-ABCD 860) without having to change the contents of the PN-Code register 720. Match 740 can indicate a match through the use of individual match lines representing each possible PN-Code match or through some other means of communication with controller 260.

The foregoing description of a correlator circuit is but one specific example however it is possible for one skilled in the art to use other implementations that take advantage of multiplicative codes. Also, the correlator as described above will detect an exact match between the incoming data stream and the PN-Code. As was discussed previously, the data stream is generally encoded with an XOR gate thus a logical 0 would create a multi-chip word that is identical to the PN-Code used to encode the data, while a logical 1 would be encoded as the inverse of the PN-Code. This means that the correlator circuit as described above would only detect logical 0s and not logical 1s. However it would be a simple matter to modify the correlator circuit by changing the comparator 730 from an 'equals' function to a 'not-equals' function thus detecting the inverse of PN-CODE-ABCD in the PN-Code register 720. Doing this would make the correlator detect logical 1s in the encoded data stream instead of logical 0s.

Returning to FIG. 5, the third step 65 waits until the correlator 700 finds a match between the incoming data and PN-CODE-HEADER. Once the correlator finds a match the fourth step 70 is to decode the packet header. The actual process of decoding data can be accomplished by one of several different methods. One method would be to use the correlator circuit to determine the start of a multi-chip word boundary. Once this is determined the incoming data stream can then be parsed into identical length multi-chip words and compared against PN-CODE-HEADER to determine if it is a logical 1 or logical 0. Another method would be to duplicate the correlator 700 using a 'not-equals' function in comparator 730 as described above in order to detect logical 0s, thus one correlator circuit would be decoding the logical 1's while another correlator circuit would be decoding the logical 0s, both of which would be combined to output the decoded data stream. Yet another method of decoding the data stream would be to change the comparator 730 to alternate between an 'equals' function and a 'not-equals' function at a fast enough rate to check each multi-chip word to determine if it is a logical 1 or a logical 0. Other methods are also possible and would be obvious to one skilled in the art.

Once the packet header is decoded the fifth step 75 is to find the PN-CODE-DATA identifier within the packet header. This step can be done by controller 260. Once PN-CODE-DATA is identified, the sixth step 80 is to initialize the decoder 220 to detect PN-CODE-DATA instead of PN-CODE-HEADER. Since PN-CODE-DATA was derived from PN-CODE-ABCD, the correlator 700 does not need to be re-programmed with a new PN-Code. Instead, the controller 260 just needs to detect a match between the incoming data and PN-CODE-DATA by using the appropriate indicator on match 740.

The seventh step 85 is to decode the data packet as it is received. Any method described in the fourth step 70 can be used to decode the data. As the data is decoded it is sent to controller 260 using connector 320 and onto computer 100 through USB port 270 and connector 300.

The eighth step 90 determines if the end of the received data packet has been reached. The end of packet indicator can be a code word embedded in the packet or it can be controlled by a counter in the controller to count the number of logical 1s and 0s received or it can be by some other method. When the end of the received data packet is found the receiver goes to the second step 60 and waits for the start of a new packet header, otherwise the process of decoding the incoming data continues with the decode step 85.

The following is a specific example of a set of ten multiplicative PN codes. Each of the following codes can function as 64-chip code or as a pair of 32-chip codes.

0x23E5DA2CCEE19E12
0x5BA357C08629EAE6
0x42AEE92DE6F8C48C
0x5EF01C36D7168A3A
0x3F163338F55E4A06
0x0B4337DCB91F3584
0x772924B60AF87AD4
0x6E28BC7458BE21 EA
0x2C9F2C6AF93950B2
0x403EF9D2876E0B8E

It is noted that the "0x" at the beginning of each code signifies a hexadecimal representation. Each code has sixteen hexadecimal numbers, each of which represents four binary bits. The above codes are merely examples. Other codes that would function could also be found.

Other Embodiments

The foregoing description for an improved method and apparatus for a DSSS system using multiplicative PN-Codes describes a specific implementation, however other implementations are also possible that would accomplish the same functionality.

For example, the embodiment described herein utilizes the USB protocol. Other embodiments utilized protocols know as 802.11 or Bluetooth. Various other protocols could also be used in alternate embodiments of the invention.

Additionally, the principles of the improved method and apparatus described herein are applicable to other types of communication. These other types of communication may include computer interfaces such as those known as: IEEE 1394, VGA, EGA, CGA, DVI, PCI, PCI Express, PS/2, RS-232, and parallel ports (SPP/ECP/EPP); network interfaces such as Ethernet, Token Ring, FDDI, SONET, and ATM; and communication standards such as CDMA, TDMA, and GSM. The improved method and apparatus also encompass other types of communication not listed above since the above list is not meant to be all-inclusive.

While the invention has been shown and described with respect to preferred embodiments thereof, it should be understood that a wide variety of other embodiments are possible without departing from the scope and sprit of the invention. The scope of the invention is only limited by the appended claims.

I claim:

1. A method of receiving data in a receiver, comprising:
   decoding a first part of the data using a first code word, wherein the first code word is one of a plurality of multiplicative codes that comprise a single code preloaded into a decoder that is to receive and decode the data without having to swap codes in and out of the decoder, and wherein the plurality of multiplicative codes are of varying lengths;
   determining a second code word based on information contained in the decoded first part of the data, wherein the second code word is another one of the plurality of multiplicative codes of the single code, and wherein determining the second code word comprises identifying an identifier in the information contained in the decoded first part of the data to determine the second code word; and
   decoding a second part of the data using the second code word.

2. The method of claim 1, wherein the first code word and the second code word are multiplicative pseudo-noise codes of different lengths.

3. The method of claim 1, wherein the data is a data packet and the second code word can vary from one data packet to another.

4. The method of claim 1, wherein the receiver is a wireless type of USB device.

5. The method of claim 1, wherein the receiver receives the data from a radio-frequency (RF) signal.

6. The method of claim 1, wherein the receiver is a direct sequence spread spectrum (DSSS) device.

7. A method of transmitting data in a transmitter, comprising:
   encoding a first part of the data using a first code word, wherein the first code word is one of a plurality of multiplicative codes that comprise a single code;
   encoding a second part of the data using a second code word, wherein the second code word is another one of the plurality of multiplicative codes of the single code, wherein the plurality of multiplicative codes are of varying lengths, and wherein the first code word is selected as a common code and the second code word is selected based on a desired data rate, with the length of the second code word controlling the data rate; and
   transmitting both the encoded first part of the data and the encoded second part of the data.

8. The method of claim 7, wherein the first part of the data contains information indicating the second code word.

9. The method of claim 7, wherein the first code word and the second code word are multiplicative pseudo-noise codes of different lengths.

10. The method of claim 7, wherein the data comprised data packets and the second code word can vary from one data packet to another.

11. The method of claim 7, wherein the transmitter is a wireless type of USB device.

12. The method of claim 7, wherein the transmitter transmits the data using a radio-frequency (RF) signal.

13. The method of claim 7, wherein the transmitter is a direct sequence spread spectrum (DSSS) device.

14. A wireless communication system comprising:
   a transmitter comprising an RF transmitter and an encoder circuit;
   wherein the encoder circuit encodes data using a first code word to encode a first part of the data and a second code word to encode a second part of the data, wherein the first code word and second code word are two of a plurality of multiplicative codes that comprise a single code, wherein the plurality of multiplicative codes are of varying lengths, and wherein the first code word is selected as a common code and the second code word is selected based on a desired data rate, with the length of the second code word controlling the data rate;
   wherein the RF transmitter modulates the encoded first part of the data and the encoded second part of the data on to an RF carrier; and
   a receiver comprising an RF receiver and a decoder circuit;
   wherein the RF receiver demodulates the RF carrier to recover the encoded first part of the data and the encoded second part of the data;
   wherein the decoder circuit decodes the encoded first part of the data using the first code word and decodes the encoded second part of the data using the second code word.

15. The system of claim 14, wherein the first part of the data contains information indicating the second code word.

16. The system of claim 14, wherein the first code word and the second code word are multiplicative pseudo-noise codes of different lengths.

17. The system of claim 14, wherein the data is a data packet and the second code word can vary from one data packet to another.

18. The system of claim 14, wherein the wireless communication system is a wireless type of USB device.

19. The system of claim 14, wherein the transmitter and receiver use direct sequence spread spectrum (DSSS).

20. The system of claim 14, wherein the wireless communication system is for connecting peripherals to a computer system.

21. The method of claim 7, further comprising:
   receiving said data by;
      decoding a first part of the data using the first code word, determining the second code word based on information contained in the decoded first part of the data, and decoding a second part of the data using the second code word.

* * * * *

UNITED STATES PATENT AND TRADEMARK OFFICE
CERTIFICATE OF CORRECTION

PATENT NO.      : 7,653,123 B1
APPLICATION NO. : 11/193220
DATED           : January 26, 2010
INVENTOR(S)     : Ryan Winfield Woodings Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Twenty-third Day of November, 2010

David J. Kappos
*Director of the United States Patent and Trademark Office*